United States Patent
Kwon

(10) Patent No.: US 10,911,611 B2
(45) Date of Patent: Feb. 2, 2021

(54) TRANSMITTING FAX DOCUMENT BY USING CLOUD SERVER

(71) Applicant: HEWLETT-PACKARD DEVELOPMENT COMPANY, L.P., Spring, TX (US)

(72) Inventor: Hansol Kwon, Pangyo (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/614,134

(22) PCT Filed: Mar. 14, 2018

(86) PCT No.: PCT/KR2018/002979
§ 371 (c)(1),
(2) Date: Nov. 15, 2019

(87) PCT Pub. No.: WO2019/066169
PCT Pub. Date: Apr. 4, 2019

(65) Prior Publication Data
US 2020/0076965 A1 Mar. 5, 2020

(30) Foreign Application Priority Data
Sep. 29, 2017 (KR) .......................... 10-2017-0128308

(51) Int. Cl.
G06F 3/12 (2006.01)
H04N 1/00 (2006.01)
H04N 1/32 (2006.01)

(52) U.S. Cl.
CPC ..... *H04N 1/00209* (2013.01); *H04N 1/00244* (2013.01); *H04N 1/324* (2013.01);
(Continued)

(58) Field of Classification Search
None
See application file for complete search history.

(56) References Cited

U.S. PATENT DOCUMENTS

2009/0122331 A1\* 5/2009 Yasui ................. H04N 1/33323
358/1.14
2013/0080905 A1\* 3/2013 Park .................. H04N 1/00244
715/738
(Continued)

FOREIGN PATENT DOCUMENTS

CN 101370036 A 2/2009
CN 104052901 A 9/2014
(Continued)

*Primary Examiner* — Henok Shiferaw
(74) *Attorney, Agent, or Firm* — Staas & Halsey LLP

(57) ABSTRACT

An image forming apparatus transmits a fax document using a cloud server which stores fax communication history information with respect to fax numbers. The image forming apparatus includes an image forming job performer to perform a fax function, a communicator to communicate with the cloud server, and a controller to request the cloud server for fax transmission setting information corresponding to a fax number of another image forming apparatus, receive a request result from the cloud server in response to the request, and transmit a fax document to the another image forming apparatus by applying, to the image forming job performer, a fax transmission setting based on the received request result.

15 Claims, 11 Drawing Sheets

(52) U.S. Cl.
CPC .......... *H04N 2201/0093* (2013.01); *H04N 2201/0094* (2013.01)

(56) References Cited

U.S. PATENT DOCUMENTS

| | | | |
|---|---|---|---|
| 2014/0268249 A1* | 9/2014 | Koue | H04N 1/32427 358/407 |
| 2018/0041658 A1* | 2/2018 | Kawashima | H04N 1/00832 |
| 2019/0098166 A1* | 3/2019 | Sugita | H04N 1/00 |

FOREIGN PATENT DOCUMENTS

| | | | |
|---|---|---|---|
| JP | 2010177958 A | 8/2010 |
| JP | 4640007 B2 | 12/2010 |
| JP | 6015177 B2 | 10/2016 |
| KR | 1020110020103 A | 3/2011 |
| KR | 1020120080398 A | 7/2012 |
| KR | 101432632 B1 | 8/2014 |
| KR | 1020170067337 A | 6/2017 |

\* cited by examiner

[Fig. 1]
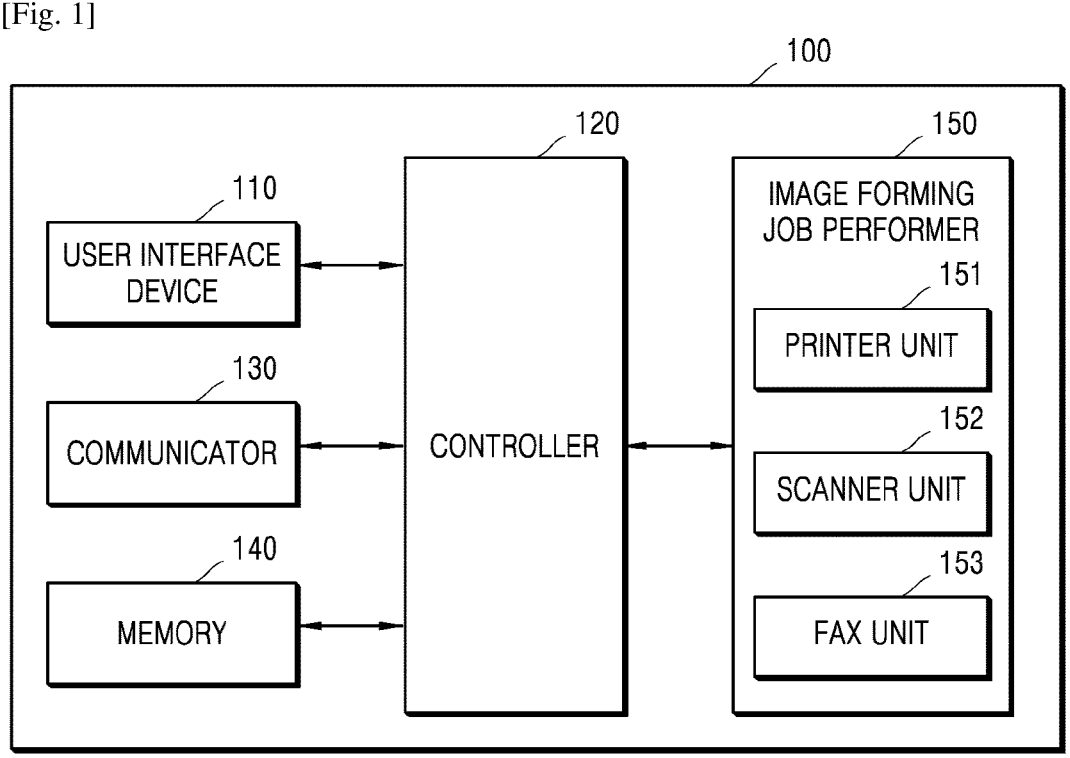

[Fig. 2]
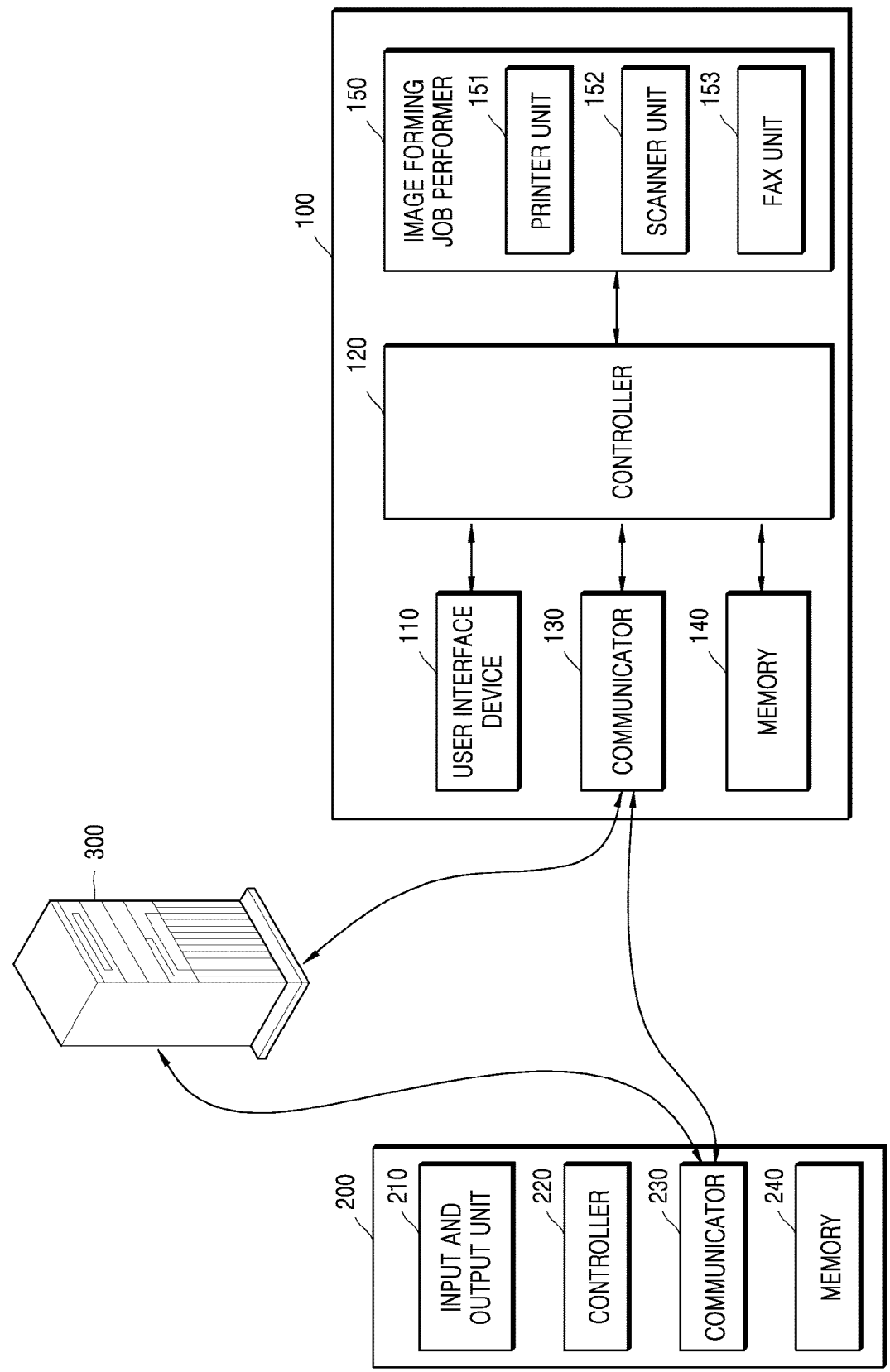

[Fig. 3]
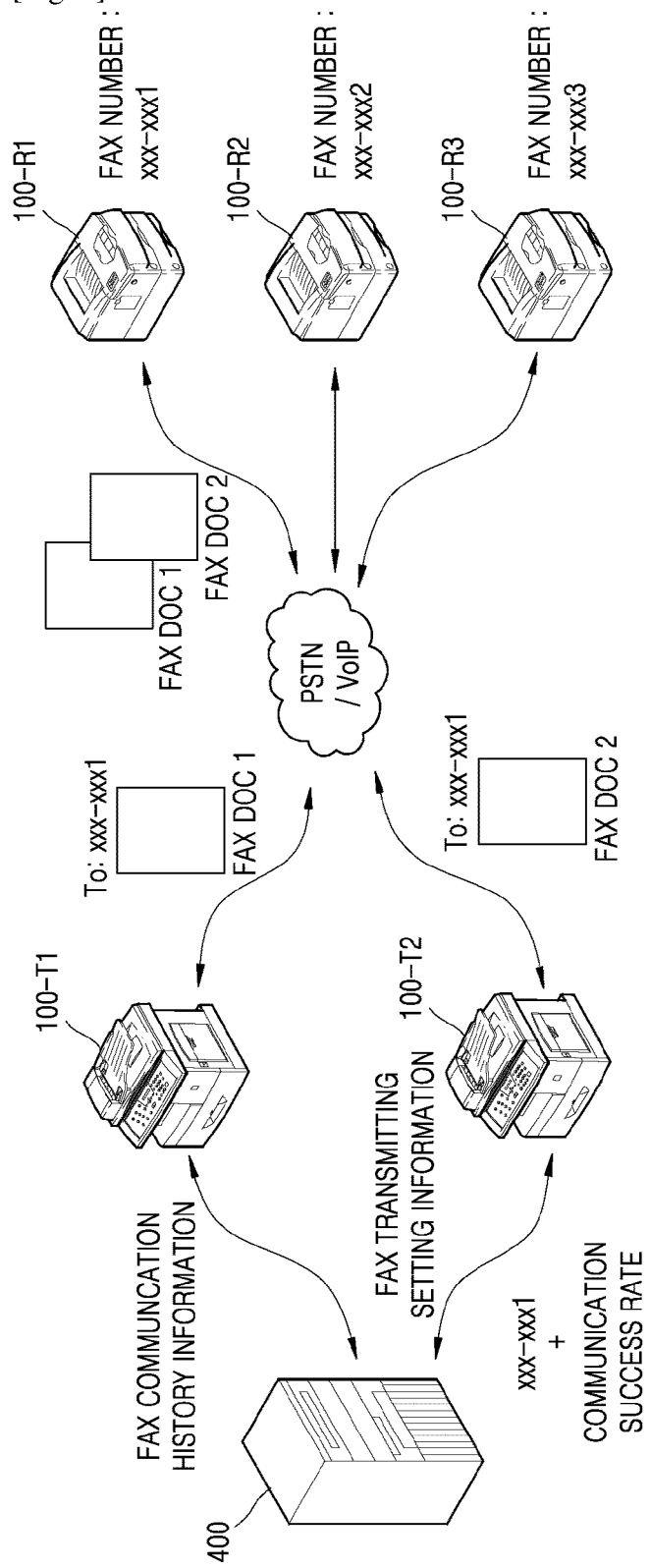

[Fig. 4]
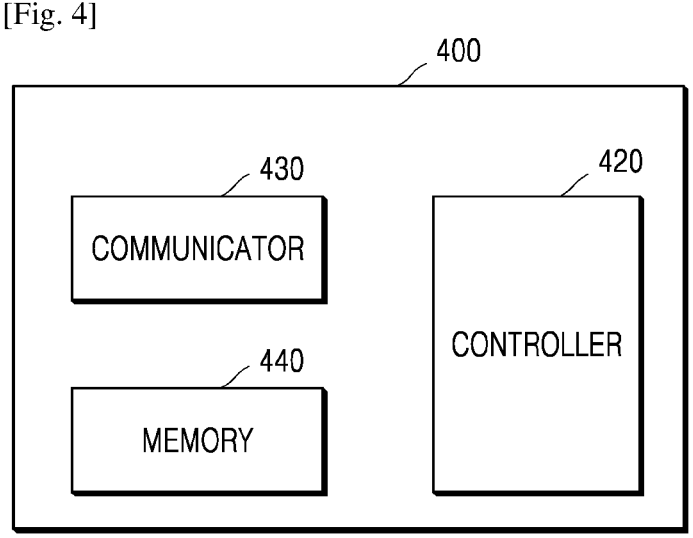

[Fig. 5]

| FAX NUMBER OF RECEIVING SIDE | DATA RECEIVING SPEED | ECM | NUMBER OF SUCCESSFUL TRANSMISSIONS | NUMBER OF FAILED TRANSMISSIONS | TOTAL NUMBER OF TRANSMISSIONS | RATE OF SUCCESSFUL COMMUNICATION |
|---|---|---|---|---|---|---|
| 123-4567 | 33.6kbps | On | 10 | 10 | 20 | 50% |
| 123-4567 | 14.4kbps | Off | 16 | 4 | 20 | 80% |
| 987-6543 | 26.4kbps | On | 7 | 2 | 9 | 78% |
| ... | | | | | | |

[Fig. 6]

| FAX CLOUD SERVER OPTION SETTING |
|---|

DEVICE REGISTRATION  [REGISTER] [BACK]

- SERVER ADDRESS : [          ]
- DEVICE MODEL NAME : [          ]    [CONNECTION TEST]
- SERIAL NUMBER : [          ]

CONNECTION STATE xxx.xxx.xxx.xxx        IN USE

[Fig. 7]

| FAX CLOUD SERVER OPTION SETTING |
|---|

STORAGE CONDITION SETTING   [SAVE] [BACK]

- ○ ALL TRANSMISSIONS   ○ USER INPUT : [ex) 80%] OR MORE
  COMMUNICATION SUCCESS RATE

SEARCH CONDITION SETTING

- COMMUNICATION SUCCESS RATE   [ex) 80%] OR MORE

[Fig. 8]
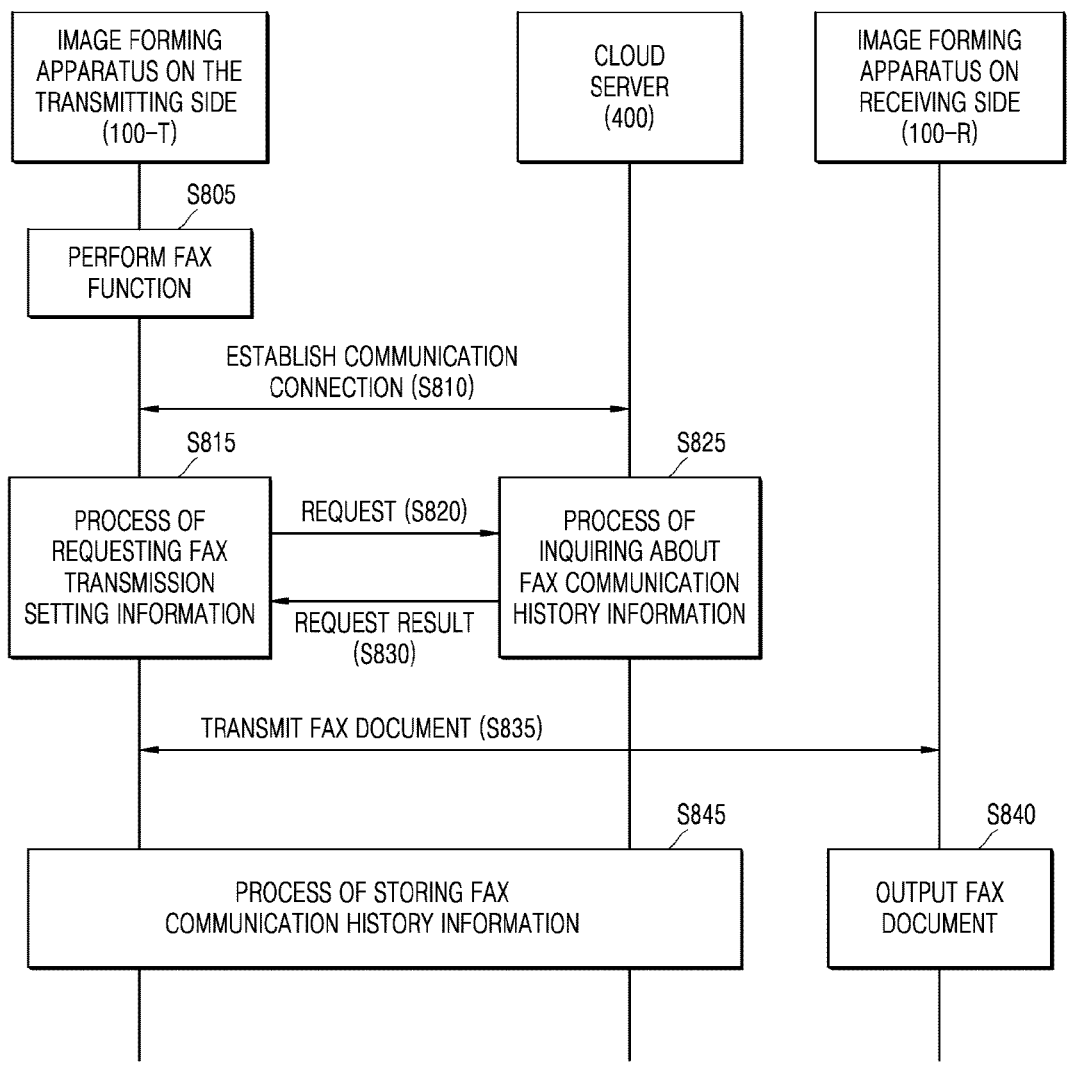

[Fig. 9]
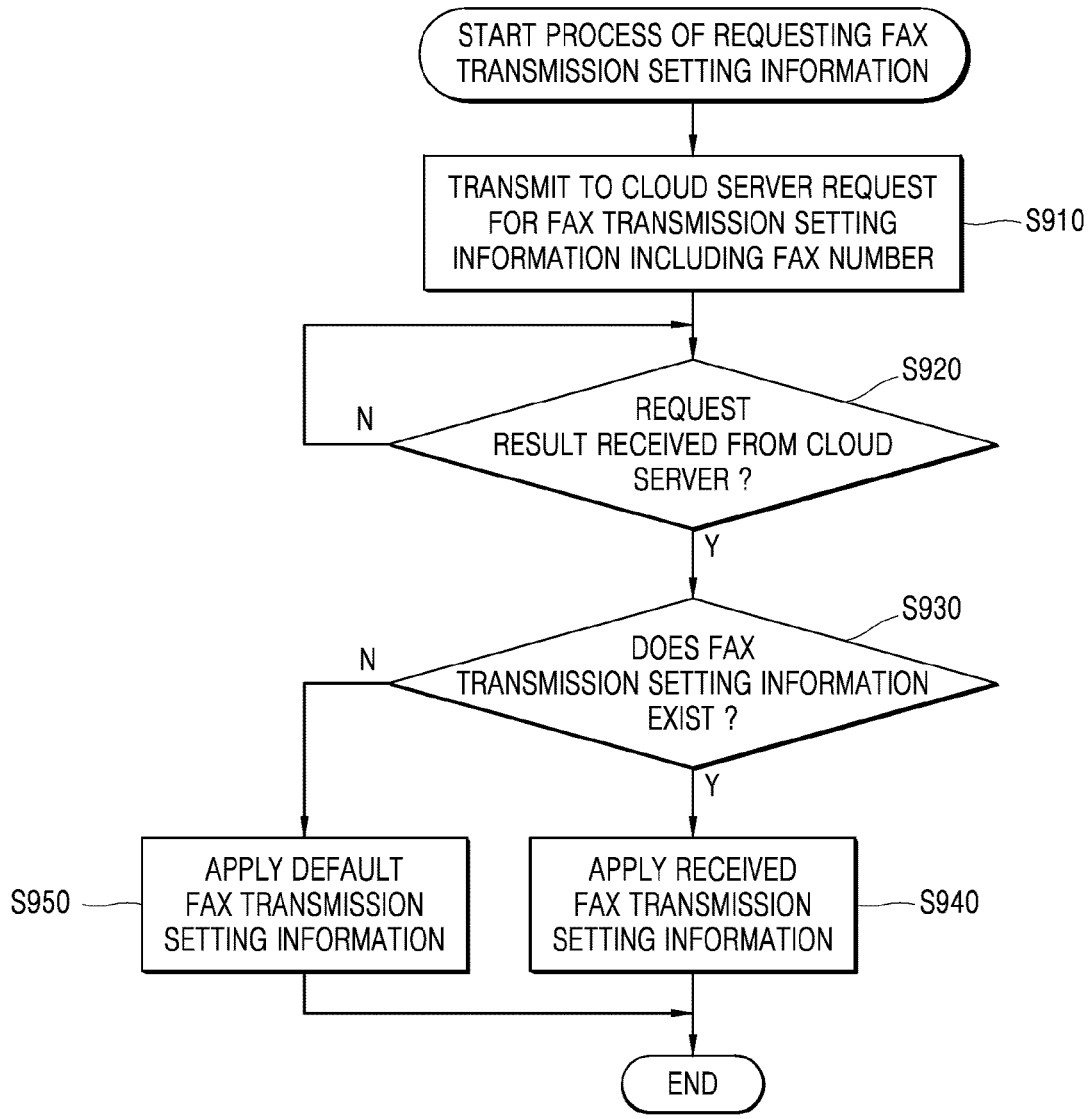
[Fig. 10]
| LINE ENVIRONMENT | DATA RECEIVING SPEED | ECM | V.34 | Tx Level |
|---|---|---|---|---|
| NORMAL | 33.6kbps | On | Enable | -12dB |
| VoIP | 14.4kbps | On | Disable | -15dB |
| NOISE | 9.6kbps | On | Disable | -9dB |
| BIG NOISE | 4.8kbps | On | Disable | -9dB |

[Fig. 11]
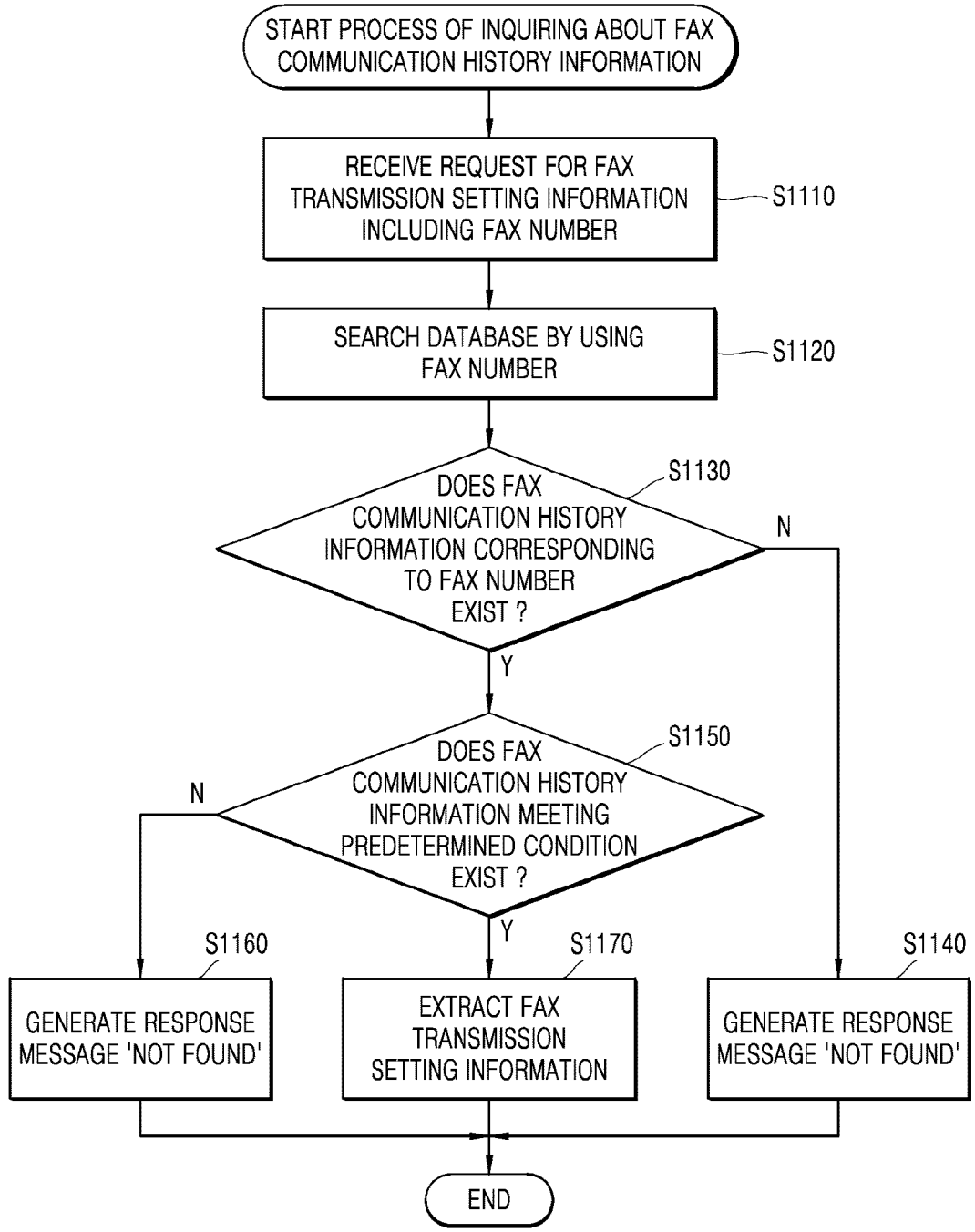

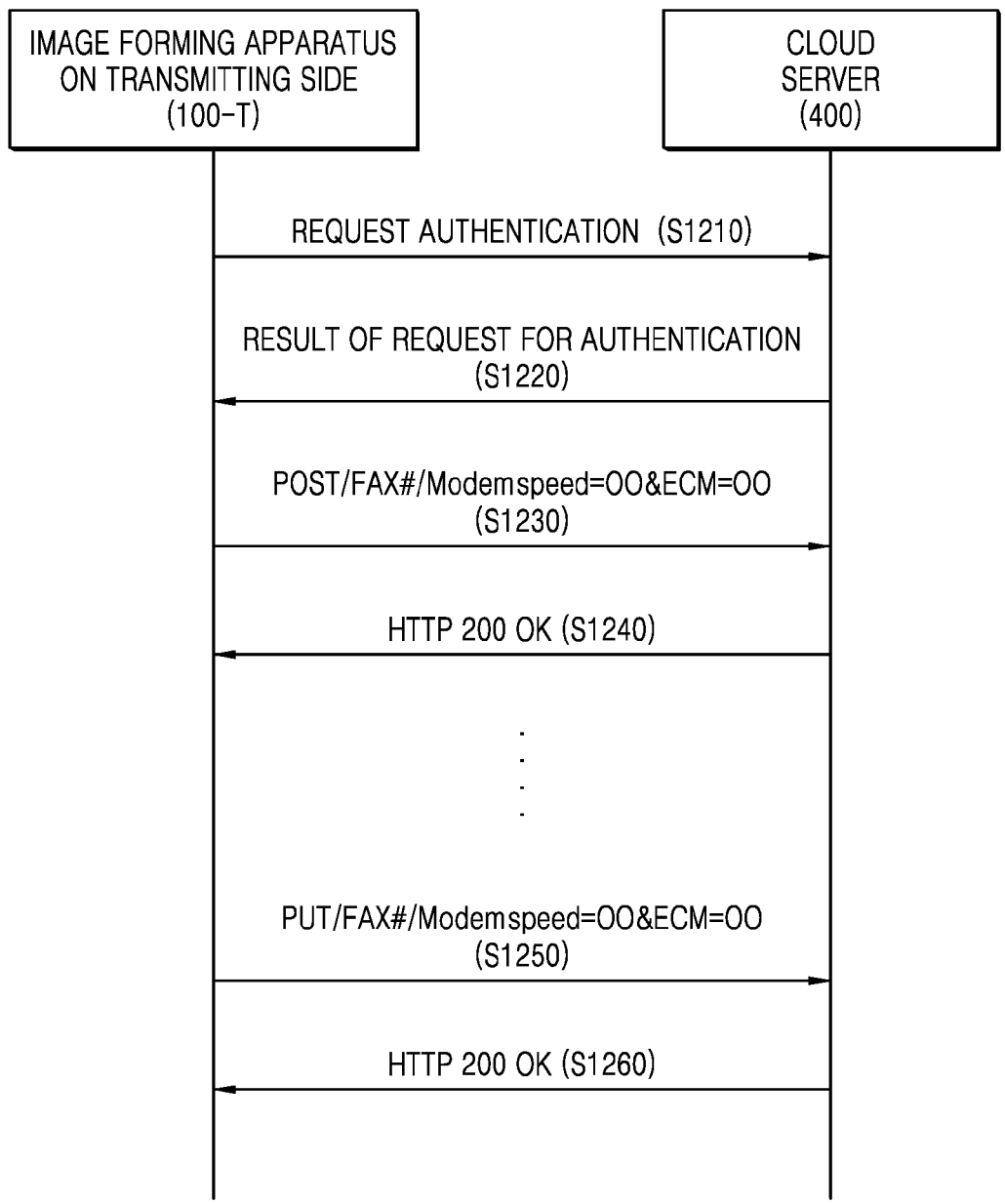
[Fig. 12]

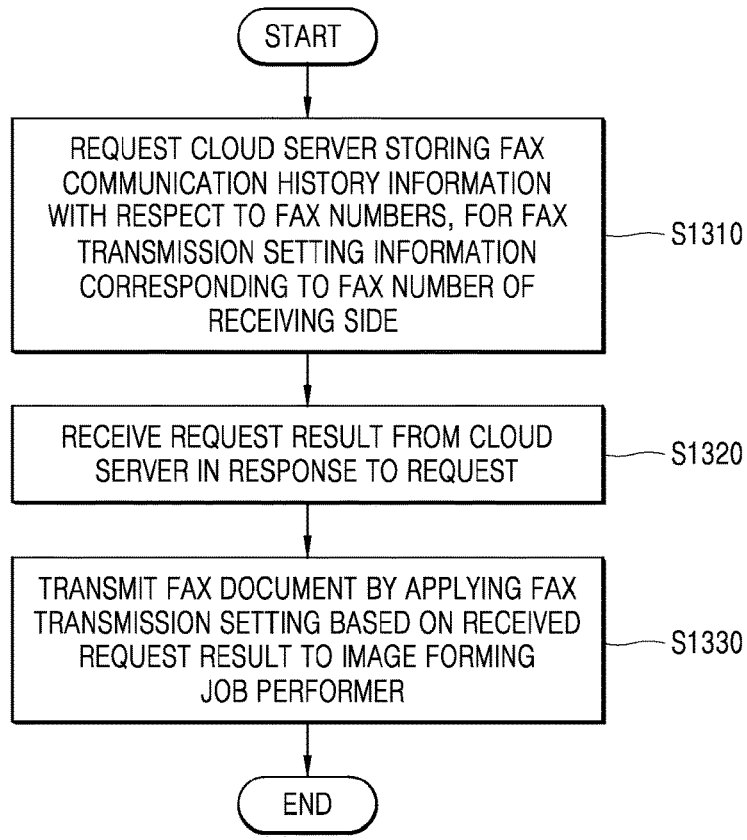
[Fig. 13]
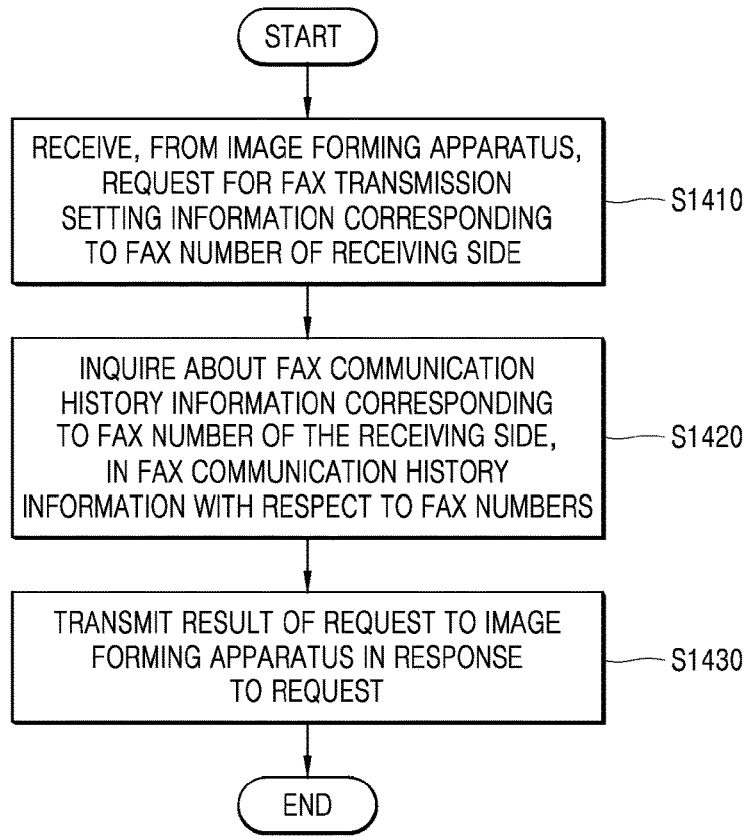
[Fig. 14]

TRANSMITTING FAX DOCUMENT BY USING CLOUD SERVER

CROSS REFERENCE TO RELATED APPLICATIONS

This application is filed under 35 U.S.C. § 371 as a National Stage of PCT International Application No. PCT/KR2018/002979, filed on Mar. 14, 2018 in the Korean Intellectual Property Office, which claims the priority benefit of Korean Patent Application No. 10-2017-0128308, filed on Sep. 29, 2017 in the Korean Intellectual Property Office. The disclosures of the PCT International Application and the Korean Patent Application are incorporated by reference herein in their entirety.

BACKGROUND ART

A facsimile (fax) machine refers to an apparatus that converts an image such as a drawing, a character or a diagram into an electrical signal and transmits the same via telephone wires, and also restores a received electrical signal into an original image.

An image forming apparatus performing a fax function performs fax communication negotiation with an image forming apparatus on a receiving side about a fax transmission setting environment to transmit a fax document.

DISCLOSURE OF INVENTION

Brief Description of Drawings

FIG. 1 is a structural block diagram of an image forming apparatus according to an example;

FIG. 2 illustrates an image forming apparatus according to an example, connected to a user terminal or a server;

FIG. 3 is a view for describing a fax system including an image forming apparatus and a cloud server according to an example, and an operation in which a fax document is transmitted by using the cloud server;

FIG. 4 illustrates a structure of a cloud server according to an example;

FIG. 5 is a view for describing fax communication history information with respect to fax numbers stored in a cloud server, according to an example;

FIG. 6 is a view for describing a screen for registering a cloud server provided by a user interface device of an image forming apparatus, according to an example;

FIG. 7 is a view for describing a screen for setting a condition regarding a communication success rate, provided by a user interface device of an image forming apparatus, according to an example;

FIG. 8 is a view for describing an operation in which a fax document is transmitted via a cloud server, and fax communication history information is stored in the cloud server, according to an example;

FIG. 9 is a flowchart of a process of requesting fax transmission setting information, according to an example;

FIG. 10 is a view for describing fax communication history information according to a fax communications network environment of a region or a country to extract default fax transmission setting information;

FIG. 11 is a flowchart of an example of a process of inquiry about fax communication history information;

FIG. 12 is a flowchart of an example of a process of storing fax communication history information;

FIG. 13 is a flowchart of a method of transmitting a fax document by using a cloud server, according to an example; and FIG. 14 is a flowchart for describing an image forming apparatus transmitting a fax document by using a cloud server, according to an example.

MODE FOR THE INVENTION

Reference will now be made in detail to examples, examples of which are illustrated in the accompanying drawings. In this regard, the examples may have different forms and should not be construed as being limited to the descriptions set forth herein.

In the specification, when an element is "connected" to another element, the elements may not only be "directly connected", but may also be "electrically connected" via another element therebetween. Also, when an element "includes" another element, the element may further include still another element instead of excluding the other element, unless otherwise differently stated.

In the description, terms including ordinal numbers such as 'first', 'second', etc. are used to describe various elements but the elements should not be defined by these terms. The terms are used only for distinguishing one element from another element.

In the specification, an "image forming job" may denote any one of various jobs (for example, printing, scanning, and faxing) related to an image, such as forming of an image or generating/storing/transmitting of an image file, and a "job" may denote not only an image forming job, but may also denote a series of processes to perform the image forming job.

Also, an "image forming apparatus" may denote any apparatus capable of performing an image forming job, such as a printer, a scanner, a fax machine, a multi-function printer (MFP), or a display apparatus.

Also, "print data" may denote data having a format printable by a printer.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires.

The examples relate to an image forming apparatus for transmitting a fax document by using a cloud server and the cloud server for supporting the image forming apparatus.

FIG. 1 is a structural block diagram of an image forming apparatus 100 according to an example. Referring to FIG. 1, the image forming apparatus 100 according to the example may include a user interface device 110, a controller 120, a communicator 130, a memory 140, and an image forming job performer 150. Also, although not illustrated in FIG. 1, the image forming apparatus 100 may further include a power supply for supplying power to each component of the image forming apparatus 100.

The user interface device 110 may include an input unit for receiving, from a user, an input for performing an image forming job, and an output unit for displaying information, such as a result of performing an image forming job or a state of the image forming apparatus 100. For example, the user interface device 110 may include an operation panel for receiving a user input and a display panel for displaying a screen.

For example, the input unit may include devices for receiving various types of user inputs, such as a keyboard, a physical button, a touch screen, a camera, and a microphone. Also, the output unit may include, for example, a display panel or a speaker. However, examples are not limited thereto, and the user interface device 110 may include devices supporting various inputs and outputs.

The controller 120 controls overall operations of the image forming apparatus 100, and may include a processor, such as a central processing unit (CPU). The controller 120 may control other components included in the image forming apparatus 100 such that an operation corresponding to a user input received through the user interface device 110 is performed. The controller 120 may include at least one specialized processor corresponding to each function or may be a single integrated processor.

For example, the controller 120 may execute a program stored in the memory 140, read data or a file stored in the memory 140, or store a new file in the memory 140.

The communicator 130 may communicate with another device or a network in a wired or wireless manner. Accordingly, the communicator 130 may include a communication module supporting at least one of various wired and wireless communication methods. For example, the communication module may be in a form of a chipset or may be a sticker or a barcode (for example, a sticker including a near field communication (NFC) tag) including information for communication.

Wireless communication may include, for example, at least one of wireless fidelity (Wi-Fi), Wi-Fi direct, Bluetooth, ultra wideband (UWB), and NFC. Wired communication may include, for example, at least one of universal serial bus (USB) and high definition multimedia interface (HDMI).

The communicator 130 may be connected to an external apparatus provided outside the image forming apparatus 100 to transmit and receive a signal or data.

FIG. 2 illustrates an image forming apparatus 100 according to an example, connected to a user terminal 200 or a server 300. Referring to FIG. 2, the image forming apparatus 100 may be connected to the user terminal 200 through the communicator 130. The communicator 130 may transmit a signal or data received from the user terminal 200 to the controller 120, or transmit a signal or data generated by the controller 120 to the user terminal 200. For example, when the communicator 130 receives a print command signal or print data from the user terminal 200, the controller 120 may output the print data through a printer unit 151.

As shown in FIG. 2, the user terminal 200 may include an input and output unit 210, a controller 220, a communicator 230, and a memory 240. The controller 220 may control an image forming job by executing a program stored in the memory 240 and transmitting a signal or data generated as a result of executing the program to the image forming apparatus 100 through the communicator 230. The user terminal 200 may include, for example, a smartphone, a tablet, a personal computer (PC), home appliances, a medical device, a camera or a wearable device.

The communicator 130 may be directly connected to the server 300 to transmit and receive a signal or data. The communicator 130 may also be connected to the user terminal 200 via the server 300. That is, the communicator 130 of the image forming apparatus 100 may transmit or receive a signal or data to or from the communicator 230 of the user terminal 200 via the server 300.

Referring back to FIG. 1, various types of data, such as a file or a program like an application, may be installed and stored in the memory 140. The controller 120 may access the data stored in the memory 140 to use the data, or may store new data in the memory 140. Also, the controller 120 may execute the program installed in the memory 140. In addition, the controller 120 may install an application received from an external source through the communicator 130 in the memory 140.

The image forming job performer 150 may perform an image forming job, such as printing, scanning, or faxing.

Referring to FIG. 1, the image forming job performer 150 may include the printer unit 151, a scanner unit 152, and a fax unit 153, but as occasion demands, the image forming job performer 150 may include some of them or may further include a component for performing another type of image forming job. The image forming job performer 150 may include a hardware component for performing an image forming job, or software or machine readable instructions for performing the image forming job.

The printer unit 151 may form an image on a recording medium via any one of various printing methods, such as an electrophotography method, an inkjet method, a thermal transfer method, and a thermal method.

The scanner unit 152 may irradiate light onto paper and receive light reflected from the paper to read an image recorded on the paper. Examples of an image sensor for reading an image from paper include a charge-coupled device (CCD) and a contact type image sensor (CIS). The scanner unit 152 may have a flatbed structure in which paper is located at a fixed location and an image sensor moves to read an image, a document feed structure in which an image sensor is located at a fixed location and paper is transferred, or a combination structure thereof.

The fax unit 153 may share a component for scanning an image with the scanner unit 152, share a component for printing a received file with the printer unit 151, transmit a scan file to a destination, or receive a file from an external source.

For example, in order to transmit a fax document, the image forming apparatus 100 may scan a document by using the scanner unit 152 to generate a fax document, and transmit a fax document by using the fax unit 153. In addition, in order to receive a fax document, the image forming apparatus 100 may receive a fax document by using the fax unit 153, and print a document on printing paper by using the printer unit 151.

Names of the above-described components of the image forming apparatus 100 may vary. In addition, the image forming apparatus 100 according to the disclosure may be embodied to include at least one of the above-described components, and some of the components may be omitted or other components may be additionally included.

The user interface device 110 of FIG. 1 may include a stand-alone control system. That is, apart from the controller 120 of the image forming apparatus 100, a control system for controlling a user interface (UI) provided by the user interface device 110 (a controller or a memory or the like) may be included. In addition, an operating system (OS) providing a UI and programs such as applications for supporting various functions may be installed in the control system of the user interface device 110.

The image forming apparatus 100 according to the disclosure may include the controller 120, the communicator 130, the memory 140, and the image forming job performer 150, and may further include the user interface device 110.

The image forming job performer 150 may perform a fax function.

The communicator 130 may communicate with a cloud server 400 (see FIG. 4) that stores fax communication history information with respect to fax numbers. The fax communication history information with respect to fax numbers may include fax communication history information transmitted by at least one another image forming apparatus 100 that uses a fax communications network, to which the image forming apparatus 100 is connected, to the cloud server 400.

The memory 140 may store computer executable instructions.

The controller 120 may request the cloud server 400 for fax transmission setting information corresponding to a fax number of the receiving side, by executing a computer executable instruction, and in response to the request, the controller 120 may receive a result of the request from the cloud server 400 to thereby transmit a fax document by applying a fax transmission setting based on the received request result to the image forming job performer 150.

If the request result received from the cloud server 400 is optimal fax transmission setting information from among fax communication history information corresponding to the fax number of the receiving side, the controller 120 may transmit a fax document by applying the fax transmission setting based on the optimal fax transmission setting information to the image forming job performer 150. The optimal fax transmission setting information may be information about a fastest data transmission speed and whether an error correction mode (ECM) is set at the data transmission speed, from among fax communication history information corresponding to the fax number of the receiving side, which has a communication success rate meeting a predetermined condition. The image forming apparatus 100 may further include the user interface device 110 providing a screen for setting a predetermined condition regarding a communication success rate.

If the request result received from the cloud server 400 indicates no fax transmission setting information corresponding to the fax number of the receiving side exists, the controller 120 may transmit a fax document by applying a fax transmission setting based on default fax transmission setting information that is previously stored in the image forming apparatus 100 to the image forming job performer 150. The previously stored default transmission setting information refers to optimal fax transmission setting information based on a fax communications network environment of a region or a country where the image forming apparatus 100 is located, and may be received from the cloud server 400 during booting of the image forming apparatus 100.

After transmitting the fax document, the controller 120 may transmit the fax communication history information corresponding to the fax number of the receiving side, to the cloud server 400 to store the same in the cloud server 400. The fax communication history information corresponding to the fax number of the receiving side may include the fax number of the receiving side, a data transmission speed at which the fax document is transmitted, information about whether an ECM is set, and a communication success rate. The image forming apparatus 100 may further include the user interface device 110 providing a screen for setting a condition regarding a communication success rate that decides whether fax communication history information corresponding to a fax number of the receiving side is to be stored in the cloud server 400 or not. Fax communication history information that has a lower communication success rate than the condition regarding the communication success rate deciding whether to store fax communication history information corresponding to a fax number of the receiving side in the cloud server 400 is not transmitted to the cloud server 400, and thus is not stored in the cloud server 400.

FIG. 3 is a view for describing a fax system including the image forming apparatus 100 and the cloud server 400 according to an example, and an operation in which a fax document is transmitted by using the cloud server 400.

Referring to FIG. 3, image forming apparatuses 100-T1 and 100-T2 on the transmitting side that transmit a fax document by using the cloud server 400 and image forming apparatuses 100-R1, 100-R2, and 100-R3 on the receiving side that receive a fax document may transmit or receive a fax document through a fax communications network. The fax communications network may be a Public Switched Telephone Network (PSTN), a Voice over Internet Protocol (VoIP) network, or a combined type network of a PSTN network and a VoIP network.

At least one image forming apparatus 100 that uses the cloud server 400 and the cloud server 400 may constitute a fax system. The image forming apparatus 100 is divided into the image forming apparatuses 100-T1 and 100-T2 on the transmitting side and the image forming apparatuses 100-R1, 100-R2, and 100-R3 on the receiving side merely for convenience of description, and each of the image forming apparatuses 100-T1, 100-T2, 100-R1, 100-R2, and 100-R3 may transmit or receive a fax document. The first image forming apparatus 100-R1 on the receiving side has a fax number "xxx-xxx1," and the second image forming apparatus 100-R2 on the receiving side has a fax number "xxx-xxx2," and the third image forming apparatus 100-R3 on the receiving side has a fax number "xxx-xxx3."

The image forming apparatuses 100-T1 and 100-T2 on the transmitting side may transmit identification information such as fax numbers, to distinguish the image forming apparatuses 100-R1, 100-R2, and 100-R3 on the receiving side, and information indicating a condition regarding a minimum communication success rate, to the cloud server 400. The cloud server 400 may inquire about history of transmitting a fax document from at least one image forming apparatus 100 connected to the cloud server 400 to the image forming apparatuses 100-R1, 100-R2, and 100-R3 on the receiving side, based on the identification information. The cloud server 400 may store fax communication history information with respect to fax numbers. The fax communication history information with respect to fax numbers may include fax communication history information transmitted by the first image forming apparatus 100-T1 on the transmitting side or the second image forming apparatus 100-T2 on the transmitting side to the cloud server 400. If fax communication history information meeting a condition regarding a minimum communication success rate is present, the cloud server 400 may extract optimal fax transmission setting information from the fax communication history information and transmit the optimal fax transmission setting information to the image forming apparatuses 100-T1 and 100-T2 on the transmitting side. The image forming apparatuses 100-T1 and 100-T2 on the transmitting side may transmit a fax document by applying, to the image forming job performer 150, a fax transmission setting based on the optimal fax transmission setting information.

For example, in the example of FIG. 3, the first image forming apparatus 100-T1 on the transmitting side may set a fax number of the receiving side as "xxx-xxx1" and transmit a first fax document (fax doc 1) to the first image forming apparatus 100-R1 on the receiving side through a fax communications network. After transmitting the first fax document (fax doc 1), the first image forming apparatus 100-T1 on the transmitting side may store fax communication history information corresponding to the first image forming apparatus 100-R1 on the receiving side, in the cloud server 400.

The second image forming apparatus 100-T2 on the transmitting side may transmit a second fax document (fax doc 2) to the first image forming apparatus 100-R1 on the receiving side via a fax communications network. Here, the second image forming apparatus 100-T2 on the transmitting side may use fax communication history information with respect to fax numbers stored in the cloud server 400 to improve a fax communication rate.

The second image forming apparatus 100-T2 on the transmitting side may obtain optimal fax transmission setting information for transmitting a fax document to the first image forming apparatus 100-R1 on the receiving side based on fax communication history information corresponding to "xxx-xxx1," which is the fax number of the first image forming apparatus 100-1 of the receiving side, from among the fax communication history information with respect to fax numbers, stored in the cloud server 400. To this end, the second image forming apparatus 100-T2 on the transmitting side may request the cloud server 400 for fax transmission setting information corresponding to the first image forming apparatus 100-R1 on the receiving side, and in response to the request, the second image forming apparatus 100-T2 may receive a result of the request from the cloud server 400. For example, the second image forming apparatus 100-T2 on the transmitting side may transmit, to the cloud server 400, information indicating a condition regarding a communication success rate with respect to the fax number "xxx-xxx1" of the first image forming apparatus 100-R1 on the receiving side, and obtain, from the cloud server 400, optimal fax transmission setting information for transmitting a fax document to the first image forming apparatus 100-R1 on the receiving side.

The second image forming apparatus 100-T2 on the transmitting side may set a fax number of the receiving side as "xxx-xxx1", and transmit a fax document (fax doc 2) to the first image forming apparatus 100-R on the receiving side through a fax communications network by applying, to the image forming job performer 150, a fax transmission setting based on the request result received from the cloud server 400.

By accumulatively storing fax communication history information of a plurality of image forming apparatuses 100 that share a common fax communications network, in the cloud server 400, the first and second image forming apparatuses 100-T1 and 100-T2 on the transmitting side may select a data transmission speed that allows a higher communication success rate and whether to apply an ECM based on past fax communication history information accumulatively stored in the cloud server 400 to transmit a fax document. Accordingly, the first and second image forming apparatuses 100-T1 and 100-T2 on the transmitting side may minimize a period of time consumed in fax communication negotiation.

FIG. 4 illustrates a structure of a cloud server 400 according to an example.

The cloud server 400 may store fax communication history information with respect to fax numbers. The fax communication history information with respect to fax numbers may be fax communication history information transmitted by a plurality of image forming apparatuses 100 that share a common fax communications network, to the cloud server 400.

The cloud server 400 may include a controller 420, a communicator 430, and a memory 440.

The communicator 430 may communicate with an image forming apparatus 100 performing a fax function. The communicator 430 may communicate with another device or a network in a wired or wireless manner, The memory 440 may store fax communication history information with respect to fax numbers, and store computer executable instructions. The fax communication history information with respect to fax numbers stored in the cloud server 400 will be described in detail with reference to FIG. 5.

FIG. 5 is a view for describing fax communication history information with respect to fax numbers stored in the cloud server 400, according to an example.

Referring to FIG. 5, fax communication history information may be stored in a database classified according to fax numbers of a receiving side. Even when fax numbers of the receiving side are the same but have different data transmission speeds, they may be stored in the cloud server 400 as different pieces of fax communication history information. The fax communication history information with respect to fax numbers may include fax communication history information transmitted by at least one image forming apparatus 100 that uses a fax communications network, to which the image forming apparatus 100 is connected, to the cloud server 400.

Fax communication history information corresponding to a fax number of the receiving side may include a fax number of the receiving side, a data transmission speed at which a fax document is transmitted, information about whether an ECM is set, and information indicating a communication success rate. Information indicating a communication success rate may include the number of trial transmissions, the number of successful transmissions, and/or the number of failed transmissions.

Referring back to FIG. 4, the controller 420 may receive a request for fax transmission setting information corresponding to a fax number of the receiving side from the image forming apparatus 100 by executing a computer executable instruction. A request from an image forming apparatus for fax transmission setting information corresponding to a fax number of the receiving side may include a fax number of the receiving side and a predetermined condition regarding a communication success rate.

The controller 420 may inquire about fax communication history information corresponding to a fax number of the receiving side in the fax communication history information with respect to fax numbers. The controller 420 may transmit a result of a request for fax transmission setting information corresponding to the fax number of the receiving side, in response to the request, to the image forming apparatus 100.

As a result of inquiring about fax communication history information corresponding to the fax number of the receiving side, if a plurality of pieces of fax communication history information correspond to the fax number of the receiving side, the controller 420 may extract optimal fax transmission setting information and transmit a result of the request including the extracted optimal fax transmission setting information to the image forming apparatus 100. The optimal fax transmission setting information may be information about a fastest data transmission speed from among fax communication history information corresponding to the fax number of the receiving side having a communication success rate that meets a predetermined condition, and about whether an ECM is set at the data transmission speed.

If no fax communication history information corresponds to the fax number of the receiving side or no fax communication history corresponding to the fax number of the receiving side having a communication rate meeting a predetermined condition is present, the controller 420 may transmit a request result including a message indicating that no fax transmission setting information corresponding to the fax number of the receiving side exists, to the image forming apparatus 100. The image forming apparatus 100 that has received the request result including the message indicating that no fax transmission setting information corresponding to the fax number of the receiving side exists may transmit a fax document by applying, to the image forming job performer 150, a fax transmission setting based on default fax transmission setting information that is previously stored in the image forming apparatus 100. The controller 420 may transmit optimal fax transmission setting information based on a fax communications network environment of a region or a country where the image forming apparatus 100 is located, as default fax transmission setting information, to the image forming apparatus 100 during booting of the image forming apparatus 100.

After the fax document is transmitted by the image forming apparatus 100, the controller 420 may receive fax communication history information corresponding to the fax number of the receiving side, from the image forming apparatus 100, and store the same. The controller 420 may receive, from the image forming apparatus 100, fax communication history information corresponding to the fax number of the receiving side meeting a condition regarding a communication success rate that determines whether to store the fax communication history information corresponding to the fax number of the receiving side in the cloud server 400, and store the same in the cloud server 400.

FIG. 6 is a view for describing a screen for registering a cloud server 400 provided by a user interface device 110 of an image forming apparatus 100, according to an example.

In order for the image forming apparatus 100 to request the cloud server 400 for fax transmission setting information corresponding to a fax number of the receiving side or to store fax communication history information corresponding to a fax number of the receiving side in the cloud server 400, an operation of registering the cloud server 400 in the image forming apparatus 100 may be performed. The operation of registering the cloud server 400 in the image forming apparatus 100 may be performed just one first time.

As illustrated in FIG. 6, a server address, a device model name, a serial number or the like may be input on a screen provided by the user interface device 110 of the image forming apparatus 100 for registering the cloud server 400, and a connection test may be conducted. The image forming apparatus 100 may transmit the serial number to the cloud server 400, and receive an authentication key in response to the serial number. The authentication key received from the cloud server 400 may be compared with an authentication key stored in the cloud server 400 when the image forming apparatus 100 is connected to the cloud server 400, and if they are identical, the image forming apparatus 100 may access the cloud server 400.

FIG. 7 is a view for describing a screen for setting a condition regarding a communication success rate, provided by a user interface device 110 of an image forming apparatus 100, according to an example is set.

The image forming apparatus 100 may include the user interface device 110 providing a screen for setting a condition to be applied when requesting the cloud server 400 for fax transmission setting information corresponding to a fax number of the receiving side or storing fax communication history information corresponding to a fax number of the receiving side in the cloud server 400. For example, when the image forming apparatus 100 requests the cloud server 400 for fax transmission setting information corresponding to a fax number of the receiving side, in order for search fax communication history information stored in the cloud server 400 for fax communication history information corresponding to a fax number of the receiving side having a communication success rate meeting a predetermined condition, the user interface device 110 may provide a screen for setting a predetermined condition regarding a communication success rate. As another example, when the image forming apparatus 100 stores fax communication history information corresponding to a fax number of the receiving side in the cloud server 400 after transmitting a fax document, in order for fax communication history information corresponding to the fax number of the receiving side having a communication success rate meeting a predetermined condition to be stored, the user interface device 110 may provide a screen for setting a condition regarding a communication success rate that determines whether to store fax communication history information corresponding to the fax number of the receiving side in the cloud server 400 or not.

FIG. 8 is a view for describing an operation in which a fax document is transmitted via a cloud server 400, and fax communication history information is stored in the cloud server 400, according to an example.

FIG. 8 shows an operation in which an image forming apparatus 100-T on the transmitting side communicates with the cloud server 400 that stores fax communication history information with respect to fax numbers, to request for fax transmission setting information corresponding to a fax number of the receiving side, and transmits a fax document by applying a fax transmission setting to the image forming job performer 150 based on a request result received from the cloud server 400, to an image forming apparatus 100-R on the receiving side, and stores fax communication history information corresponding to the fax number of the receiving side in the cloud server 400 after transmitting the fax document.

The image forming apparatus 100-T on the transmitting side may perform a fax function (S805). A user may locate a fax document to be transmitted to the image forming apparatus 100-T on the transmitting side and input a fax number of the receiving side, thereby performing a fax function.

The image forming apparatus 100-T on the transmitting side may communicate with the cloud server 400 that stores fax communication history information with respect to fax numbers, to connect to the cloud server 400 (S810). To this end, the cloud server 400 may be registered in the image forming apparatus 100-T on the transmitting side, and the image forming apparatus 100-T on the transmitting side may request the cloud server 400 for authentication. For example, the image forming apparatus 100-T on the transmitting side may request the cloud server 400 for authentication by using an authentication key received from the cloud server 400 when the cloud server 400 was registered.

The image forming apparatus 100-T on the transmitting side may perform a process of requesting fax transmission setting information (S815). When the process of requesting fax transmission setting information begins, the image forming apparatus on the transmitting side may request the cloud server 400 for fax transmission setting information corresponding to a fax number of the receiving side (S820). This will be described in detail with reference to FIG. 9.

FIG. 9 is a flowchart of a process of requesting fax transmission setting information, according to an example.

The image forming apparatus 100-T on the transmitting side may transmit, to the cloud server 400, a request for fax transmission setting information including a fax number of the receiving side (S910). The request for fax transmission setting information may further include information indicating a condition regarding a communication success rate. The condition regarding a communication success rate is a condition regarding a minimum communication success rate of fax communication history information to be inquired about by the cloud server 400, and may be transmitted together when requesting fax transmission setting information, or may be transmitted in advance when an initial communication connection between the image forming apparatus 100-T on the transmitting side and the cloud server 400 is performed.

After requesting fax transmission setting information including the fax number of the receiving side, the image forming apparatus 100-T on the transmitting side may check whether a request result is received from the cloud server 400 (S920). If no request result is received from the cloud server 400, the image forming apparatus 100-T on the transmitting side remains on standby to receive one.

When a request result is received from the cloud server 400, the image forming apparatus 100-T on the transmitting side may check whether fax transmission setting information exists (S930).

If the request result received from the cloud server 400 is optimal fax transmission setting information from among fax communication history information corresponding to the fax number of the receiving side, a fax transmission setting based on the received optimal fax transmission setting information may be applied to the image forming job performer 150 (S940). The optimal fax transmission setting information may be information about a fastest data transmission speed from among fax communication history information corresponding to a fax number of the receiving side having a communication success rate that meets a predetermined condition and about an ECM is set at the data transmission speed.

If the request result received from the cloud server 400 indicates no fax transmission setting information corresponding to a fax number of the receiving side exists, the image forming apparatus 100-T on the transmitting side may apply a fax transmission setting based on default fax transmission setting information that is previously stored in the image forming apparatus 100-T on the transmitting side, to the image forming job performer 150 (S950). The default transmission setting information refers to optimal fax transmission setting information based on a fax communications network environment of a region or a country where the image forming apparatus 100-T on the transmitting side is located, and may be received from the cloud server 400 during booting of the image forming apparatus 100-T on the transmitting side.

FIG. 10 is a view for describing fax communication history information according to a fax communications network environment of a region or a country to extract default fax transmission setting information.

In order for the cloud server 400 to extract default fax transmission setting information, fax communication history information according to a fax communications network environment of a region or a country where the image forming apparatus 100-T on the transmitting side is located, stored in the cloud server 400, may be used. The cloud server 400 may gather fax communication history information of the image forming apparatus 100 connected to a network according to a regional code or a country code. The cloud server 400 may analyze fax communication history information gathered according to regions or countries, to determine and extract optimal fax transmission setting information based on a fax communications network environment of the region or country where the image forming apparatus 100-T on the transmitting side is located. The cloud server 400 may analyze the gathered fax communication history information to classify a line environment as Normal, VoIP, Noise, Big Noise or the like as illustrated in FIG. 10 according to communication success rates. The cloud server 400 may extract optimal fax transmission setting information based on a fax communications network environment of a region or a country where the image forming apparatus 100-T on the transmitting side is located, based on the analyzed fax communication history information, and transmit the optimal fax transmission setting information as default fax transmission setting information to the image forming apparatus 100-T on the transmitting side.

The process of requesting fax transmission setting information is completed as the image forming apparatus 100-T on the transmitting side applies a fax transmission setting based on a result of the request for the fax transmission setting information. The image forming apparatus 100-T on the transmitting side may apply a fax transmission setting based on the optimal fax transmission setting information or the default fax transmission setting information, to the image forming job performer 150.

Referring back to FIG. 8, the cloud server 400 may perform a process of inquiring about fax communication history information (S825). Accordingly, the cloud server 400 may transmit a result of requesting fax transmission setting information to the image forming apparatus 100-T on the transmitting side (S830). This will be described in detail with reference to FIG. 11.

FIG. 11 is a flowchart illustrating an example of a process of inquiring about fax communication history information.

The cloud server 400 may receive a request for fax transmission setting information including a fax number of the receiving side, from the image forming apparatus 100-T on the transmitting side (S1110).

The cloud server 400 may search a database storing fax communication history information with respect to fax numbers, by using the fax number of the receiving side, received from the image forming apparatus 100-T on the transmitting side (S1120).

The cloud server 400 may determine whether fax communication history information corresponding to the fax number of the receiving side exists (S1130).

If no fax communication history information corresponding to the fax number of the receiving side exists, the cloud server 400 may generate a message indicating that no fax communication history information corresponding to the fax number of the receiving side exists (S1140).

If fax communication history information corresponding to the fax number of the receiving side exists, the cloud server 400 may determine whether fax communication history information meeting a predetermined condition exists (S1150). For example, the cloud server 400 may determine whether fax communication history information having a minimum communication success rate set by the image forming apparatus 100-T on the transmitting side exists in the database of the cloud server 400.

If no fax communication history information meeting a predetermined condition exists, the cloud server 400 may generate a message indicating that no fax transmission setting information corresponding to the fax number of the receiving side exists (S1160).

If fax communication history information meeting a predetermined condition exists, the cloud server 400 may extract fax transmission setting information from the fax communication history information (S1170). As a result of inquiring about fax communication history information corresponding to the fax number of the receiving side, if a plurality of pieces of fax communication history information correspond to the fax number of the receiving side, the cloud server 400 may extract optimal fax transmission setting information. The optimal fax transmission setting information may be information about a fastest data transmission speed from among fax communication history information corresponding to the fax number of the receiving side having a communication success rate meeting a predetermined condition and about whether an ECM is set at the fastest data transmission speed.

When the process of inquiring about fax communication history information is completed, the cloud server 400 may transmit a result of requesting fax transmission setting information to the image forming apparatus 100-T on the transmitting side (S830). For example, the cloud server 400 may transmit a request result including a message indicating that no optimal fax transmission setting information or no fax transmission setting information corresponding to the fax number of the receiving side exists.

Referring back to FIG. 8, the image forming apparatus 100-T on the transmitting side may transmit a fax document by applying, to the image forming job performer 150 of the image forming apparatus 100-T on the transmitting side, a fax transmission setting based on the request result received from the cloud server 400 (S835).

The image forming apparatus 100-R on the receiving side may receive the fax document from the image forming apparatus 100-T on the transmitting side, and output the fax document (S840).

[After transmitting the fax document, the image forming apparatus 100-T on the transmitting side may perform a process of storing fax communication history information (S845). This will be described in detail with reference to FIG. 12.

FIG. 12 is a flowchart of an example of a process of storing fax communication history information.

When transmission of a fax document is completed, the image forming apparatus 100-T on the transmitting side may request the cloud server 400 for authentication. For example, the image forming apparatus 100-T on the transmitting side may request the cloud server 400 for authentication by using an authentication key received from the cloud server 400 when the cloud server 400 was registered to the image forming apparatus 100-T on the transmitting side (S1210).

The cloud server 400 may perform authentication according to a request for authentication by the image forming apparatus 100-T on the transmitting side, and transmit a result of the request for authentication to the image forming apparatus 100-T on the transmitting side (S1220).

After transmission of the fax document is completed, the image forming apparatus 100-T on the transmitting side, authentication of which has been completed, may transmit fax communication history information corresponding to the fax number of the receiving side to the cloud server 400. If no fax communication history information corresponding to the fax number of the receiving side has ever been stored in the database of the cloud server 400, the image forming apparatus 100-T on the transmitting side may use a RESTful POST application programming interface (API) to store fax communication history information corresponding to the fax number of the receiving side, in the cloud server 400 (S1230).

The cloud server 400 may transmit, to the image forming apparatus 100-T on the transmitting side, feedback indicating that the fax communication history information is stored (S1240).

If fax communication history information corresponding to the fax number of the receiving side is already stored in the database of the cloud server 400, the image forming apparatus 100-T on the transmitting side may update the fax communication history information corresponding to the fax number of the receiving side, by using a RESTful PUT API from a next piece of fax communication history information (S1250).

After the fax communication history information is updated in the database, the cloud server 400 may transmit, to the image forming apparatus 100-T on the transmitting side, feedback indicating that the fax communication history information is stored (S1260).

FIG. 13 is a flowchart of a method of transmitting a fax document by using a cloud server 400, according to an example.

In operation 1310, the image forming apparatus 100 may request the cloud server 400 storing fax communication history information with respect to fax numbers, for fax transmission setting information corresponding to a fax number of the receiving side.

In operation 1320, the image forming apparatus 100 may receive a request result in response to the request for fax transmission setting information corresponding to the fax number of the receiving side.

In operation 1330, the image forming apparatus 100 may transmit a fax document by applying, to the image forming job performer, a fax transmission setting based on the received request result. If the request result received from the cloud server 400 is optimal fax transmission setting information from among fax communication history information corresponding to the fax number of the receiving side, the image forming apparatus 100 may transmit a fax document by applying, to the image forming job performer 150, a fax transmission setting based on the optimal fax transmission setting information. Here, the optimal fax transmission setting information may be information about a fastest data transmission speed from among fax communication history information corresponding to the fax number of the receiving side having a communication success rate meeting a predetermined condition and about whether an ECM is set at the data transmission speed. If the request result received from the cloud server 400 indicates that no fax transmission setting information corresponding to the fax number of the receiving side exists, the controller 120 may transmit a fax document by applying, to the image forming job performer 150, a fax transmission setting based on default fax transmission setting information that is previously stored in the image forming apparatus 100. The previously stored default transmission setting information refers to optimal fax transmission setting information based on a fax communications network environment of a region or a country where the image forming apparatus 100 is located, and may be received from the cloud server 400 during booting of the image forming apparatus 100.

Meanwhile, after transmitting the fax document, the image forming apparatus 100 may store the fax communication history information corresponding to the fax number of the receiving side, in the cloud server 400. The fax communication history information corresponding to the fax number of the receiving side may include a fax number of the receiving side, a data transmission speed at which the fax document is transmitted, information about whether an ECM is set, and a communication success rate.

FIG. 14 is a flowchart for describing an image forming apparatus 100 for transmitting a fax document by using a cloud server 400, according to an example.

In operation 1410, the cloud server 400 may receive from the image forming apparatus 100 a request for fax transmission setting information corresponding to a fax number of the receiving side.

In operation 1420, the cloud server 400 may inquire about fax communication history information corresponding to the fax number of the receiving side in fax communication history information with respect to fax numbers.

In operation 1430, the cloud server 400 may transmit a request result to the image forming apparatus 100 in response to the request for fax transmission setting information corresponding to the fax number of the receiving side. As a result of inquiring about fax communication history information corresponding to the fax number of the receiving side, if a plurality of pieces of fax communication history information correspond to the fax number of the receiving side, the cloud server 400 may extract optimal fax transmission setting information and transmit a request result including the extracted optimal fax transmission setting information. If no fax communication history information corresponding to the fax number of the receiving side exists or no fax communication history information corresponding to the fax number of the receiving side having a communication success rate meeting a predetermined condition exists, the cloud server 400 may transmit, to the image forming apparatus 100, a request result including a message indicating that no fax transmission setting information corresponding to the fax number of the receiving side exists.

After a fax document is transmitted from the image forming apparatus 100, the cloud server 400 may receive, from the image forming apparatus 100, fax communication history information corresponding to the fax number of the receiving side and store the same.

The above-described examples may be implemented in the form of a computer readable storage medium storing computer executable instructions and data. At least one of the instructions and data may be stored in the form of a program code, and generate a predetermined program module to perform a predetermined operation. Examples of the computer readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSDs), and any device that is capable of storing the machine readable instructions or software and any associated data, data files, and data structures and providing the machine readable instructions or software and any associated data, data files, and data structures to a processor or computer so that the processor or computer can execute the instructions. In one example, the computer readable storage medium may be the memory 140 of the image forming apparatus 100 or the memory of the user interface device 110.

While this disclosure includes examples, it will be apparent to that various changes in form and details may be made in these examples without departing from the spirit and scope of the claims and their equivalents.

The invention claimed is:

1. An image forming apparatus, comprising:
an image forming job performer, including at least one of a scanner or printer, to perform a fax function;
a communicator, including a transmitter and receiver, to communicate with a cloud server which stores fax communication history information corresponding to fax numbers, the fax communication history information including fax communication history information corresponding to a fax number of another image forming apparatus regarding transmission of at least one fax document by at least one other image forming apparatus to the another image forming apparatus; and
a controller, including at least one processor, to:
request the cloud server for fax transmission setting information corresponding to the fax number of the another image forming apparatus,
receive a request result from the cloud server in response to the request, the request result being based on the fax communication history information corresponding to the fax number of the another image forming apparatus, and
transmit a fax document to the another image forming apparatus by applying, to the image forming job performer, a fax transmission setting based on the received request result.

2. The image forming apparatus of claim 1, wherein if the request result received from the cloud server is optimal fax transmission setting information from among fax communication history information corresponding to the fax number of the another image forming apparatus, the controller is to transmit the fax document to the another image forming apparatus by applying, to the image forming job performer, a fax transmission setting based on the optimal fax transmission setting information.

3. An image forming apparatus, comprising:
an image forming job performer, including at least one of a scanner or printer, to perform a fax function;
a communicator, including a transmitter and receiver, to communicate with a cloud server which stores fax communication history information corresponding to fax numbers; and
a controller, including at least one processor, to:
request the cloud server for fax transmission setting information corresponding to a fax number of another image forming apparatus,
receive a request result from the cloud server in response to the request, and
transmit a fax document to the another image forming apparatus by applying, to the image forming job performer, a fax transmission setting based on the received request result,
wherein
if the request result received from the cloud server is optimal fax transmission setting information from among fax communication history information corresponding to the fax number of the another image forming apparatus, the controller is to transmit the fax document to the another image forming apparatus by applying, to the image forming job performer, a fax transmission setting based on the optimal fax transmission setting information, and
the optimal fax transmission setting information comprises information about a fastest data transmission speed from among fax communication history information corresponding to the fax number of the another image forming apparatus having a communication success rate meeting a predetermined condition and information about whether an error correction mode (ECM) is set at the data transmission speed.

4. The image forming apparatus of claim 3, further comprising a user interface device to provide a screen to set the predetermined condition regarding the communication success rate.

5. The image forming apparatus of claim 1, further comprising a memory to store default fax transmission setting information, wherein if the request result received from the cloud server indicates that no fax transmission setting information corresponding to the fax number of the another image forming apparatus exists, the controller is to transmit the fax document by applying, to the image forming job performer, a fax transmission setting based on the default fax transmission setting information stored in the memory of the image forming apparatus.

6. The image forming apparatus of claim 5, wherein the communicator is to receive the default transmission setting information from the cloud server during booting of the image forming apparatus and the controller is to control the default transmission setting information received from the cloud server to be stored in the memory, and the default transmission setting information stored in the memory comprises optimal fax transmission setting information based on a fax communications network environment of a region or a country where the image forming apparatus is located.

7. The image forming apparatus of claim 1, wherein the fax communication history information corresponding to fax numbers comprises fax communication history information transmitted, to the cloud server, by the at least one other image forming apparatus that uses a fax communications network, to which the image forming apparatus is connectable.

8. The image forming apparatus of claim 1, wherein after transmitting the fax document, the controller is to store, in the cloud server, fax communication history information corresponding to the fax number of the another image forming apparatus.

9. The image forming apparatus of claim 8, wherein the fax communication history information corresponding to the fax number of the another image forming apparatus which the image forming apparatus stores in the cloud server comprises the fax number of the another image forming apparatus, a data transmission speed at which the fax document was transmitted, information about whether an error correction mode (ECM) is set, and information indicating a communication success rate.

10. The image forming apparatus of claim 8, further comprising a user interface device to provide a screen for setting a condition regarding a communication success rate to determine whether to store fax communication history information corresponding to the fax number of the another image forming apparatus, in the cloud server.

11. A cloud server, comprising:
a communicator, including a transmitter and receiver, to communicate with an image forming apparatus which performs a fax function;
a memory to store fax communication history information corresponding to fax numbers, the fax communication history information including fax communication history information corresponding to a fax number of another image forming apparatus regarding transmission of at least one fax document by at least one other image forming apparatus to the another image forming apparatus; and
a controller, including at least one processor, to:
receive, from the image forming apparatus, a request for fax transmission setting information corresponding to the fax number of the another image forming apparatus,
search for the fax communication history information corresponding to the fax number of the another image forming apparatus, in the fax communication history information with respect to fax numbers, and
transmit a request result to the image forming apparatus in response to the request based on a result of the search of the fax communication history information corresponding to the fax number of the another image forming apparatus.

12. The cloud server of claim 11, wherein when the result of the search for the fax communication history information corresponding to the fax number of the another image forming apparatus indicates a plurality of pieces of fax communication history information correspond to the fax number of the another image forming apparatus, the controller is to extract optimal fax transmission setting information and to transmit the request result including the extracted optimal fax transmission setting information.

13. The cloud server of claim 11, wherein the request, from the image forming apparatus, for the fax transmission setting information corresponding to the fax number of the another image forming apparatus comprises the fax number of the another image forming apparatus and a predetermined condition regarding a communication success rate.

14. The cloud server of claim 11, wherein when the result of the search for the fax communication history information corresponding to the fax number of the another image forming apparatus indicates no fax communication history information corresponds to the fax number of the another image forming apparatus exists or no fax communication history corresponding to the fax number of the another image forming apparatus having a communication rate meeting a predetermined condition exists, the controller is to transmit, to the image forming apparatus, the request result including a message indicating that no fax transmission setting information corresponding to the fax number of the another image forming apparatus exists.

15. The cloud server of claim 11, wherein after the fax document is transmitted by the image forming apparatus, the controller is to receive, from the image forming apparatus, fax communication history information corresponding to the fax number of the another image forming apparatus and to control the memory to store the fax communication history information.

* * * * *